Oct. 11, 1938.  W. S. JONES  2,132,631

AUTOMATIC HYDRAULIC CLUTCH

Filed Aug. 6, 1937

Wallace S. Jones
INVENTOR.

BY Howard Fischer
ATTORNEYS.

Patented Oct. 11, 1938

2,132,631

UNITED STATES PATENT OFFICE 2,132,631

AUTOMATIC HYDRAULIC CLUTCH

Wallace S. Jones, St. Paul, Minn.

Application August 6, 1937, Serial No. 157,718

10 Claims. (Cl. 192—58)

My invention relates to an improvement in a hydraulic transmission where it is desired to provide a device capable of driving a shaft to a variable speed depending upon the torque load upon the driven shaft.

In recent years many attempts have been made to provide a transmission capable of delivering power to a driven shaft at variable speeds depending upon the load driven. Some of these devices have been used to eliminate the usual type of transmission in automotive vehicles in order to eliminate the vehicle gear shift lever. While some of these transmissions have been successful, they are ordinarily extremely complicated and accordingly apt to be disabled more quickly than other types of transmission.

While my transmission may be used to eliminate the shifting of gears in a vehicle, it is designed particularly to provide a more flexible range of speed without the necessity of changing gears. In other words, while my device is capable of delivering power at various speeds depending upon the load, it is particularly designed for use as a variable speed clutch of a simple nature which when used upon a motor vehicle will greatly reduce the gear shifting necessity.

It is a purpose of my invention to provide a casing attached for rotation with one shaft which incloses a motor secured on another shaft. This rotor provides a series of angularly spaced cylinders for the accommodation of hollow pistons. The rotor operates in an eccentric aperture in the casing in such a way that the pistons are urged into the cylinders by the casing. Movement of the pistons is resisted by fluid trapped within the pistons, and the increased length of travel, and piston resistance, increases the speed of the casing. As a result at higher speeds the rotor tends to rotate simultaneously with and at the same speed as the casing. Whereas at low speeds, greater slippage between these elements is permitted.

It is a purpose of my invention to provide a series of cylinders extending outwardly from the center of a rotor and to position in these cylinders pistons which are open at both ends. The flow of liquid through the pistons is restricted because of the bearing of these pistons against the eccentric wall of the outer casing. The pistons may be thrown outwardly in the cylinders by centrifugal force, oil entering the outer end thereof. As the rotor continues rotation, however, the eccentric wall of the casing tends to urge the pistons inwardly in the cylinders. In order that the pistons may move inwardly, oil must escape from the pistons through the outer end thereof. As the outer ends of the pistons are against the casing wall, it is difficult for the oil to pass quickly from the pistons, thus tending to rotate the casing with the rotor.

It is an object of my invention to provide a clutch or transmission embodying merely a rotor and casing and a series of pistons open at both ends which are not positively driven in either direction by any force other than centrifugal force, or by action of the eccentric housing. An extremely simple construction is thus formed which cannot readily get out of order or become disabled.

It is a further feature of my invention to provide a clutch or transmission which may if desired include a plurality of axially spaced sets of radially extending pistons, each set of which is cooperable with an eccentric aperture in the outer casing. The eccentricity of the apertures connected with each set of pistons may be so arranged as to balance with one or more of the remaining sets. For example, if two sets of axially spaced pistons are provided, the aperture in which one set of pistons operate is centered on one side of the shaft, while the other aperture is eccentric on the diametrically opposite side of the shaft. In this way the pistons engage the casing in a manner to balance the force on the shaft.

It is a further feature of my invention that the hollow pistons may be formed in such a way that a certain amount of liquid is permitted to leak therefrom in the rotation of the rotor so as to prevent the locking of the rotor with respect to the casing, when such locking is not desired. This I accomplish by designing the ends of the pistons so as to permit some leakage.

These and other objects and novel features of my invention will be more clearly and fully set forth in the following specification and claims:

In the drawing forming a part of my invention:

Figure 2:
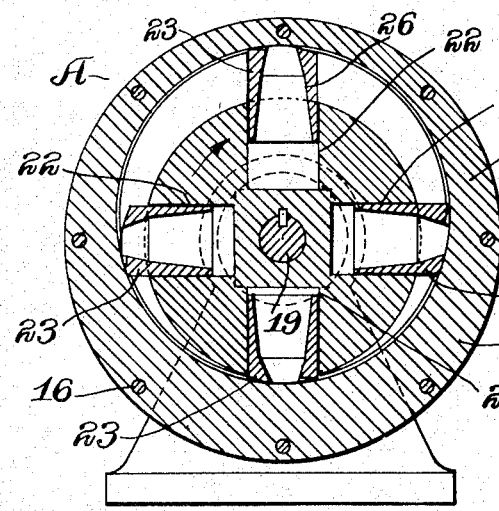
Figure 2 is a cross-sectional view taken on the line indicated 2—2 on Figure 1.

My transmission A comprises a casing 10, including an end plate 11 connected directly to the driven shaft 12. The end plate 11 is spaced by means of eccentric or cam shaped track portions 13 and 14 from a second end plate 15. The end plates 10 and 15 and track portions 13 and 14 are held together by any means such as bolts 16, and suitable gasket means or packing may be positioned between these parts to prevent leakage. A packing joint 17 is provided in the end plate 15 to fit around the driving shaft 19 to prevent leakage of oil from the casing or housing 10 about the shaft 19.

The shaft 19 extends into the housing 10, and a rotor or rotors 20 is mounted upon the shaft 19 and secured for rotation therewith by keys 21 or other suitable means. Two rotors 20 are provided in Figure 1 of the drawings, each secured to the shaft 19. Each rotor is provided with radially extending cylindrical recesses 22 angularly spaced for accommodation of hollow pistons 23. It is obvious that if it was desired, the rotor 20 could be formed in a single piece, rather than in two parts as illustrated.

The track portions 13 and 14 are provided with eccentrically arranged openings 24 therein, and the centers of these eccentric openings 24 are arranged on opposite sides of the center of the shaft 19. It will be understood that the opening 24 need not be circular or cylindrical, but may be cam shaped, having an irregular outline just so they are centered on opposite sides of the shaft to provide balance between the two. Accordingly, in speaking of eccentric openings, or tracks, I desire to have it understood that these need not be circularly eccentric.

Rounded grooves 25 may be formed on the inner wall of the tracks 13 and 14 in which the pistons 23 may slide. The pistons 23 are hollow and cylindrical, having an opening 26 extending through the same from one end to the other. The outer surface of the pistons 23 is rounded slightly more than the curvature of the tracks 25, or are not rounded from a point centering on the axis of these pistons. The shape of these pistons is such that they will best fit the eccentric track during the compression stroke. This permits the pistons to be readily filled during the time they are moving outwardly in the cylinders, and yet creates a fairly snug fit with respect to the track 25 during a part of the compression stroke. It is necessary, however, that the pistons 23 do not fit the groove 25 tightly at any time, so as to prevent escape of oil from the pistons. To assist this action, I provide a groove 27 in the end of the piston through which some of the fluid under pressure may extend to force the piston away from the track 25.

The operation of the device is believed clear from the foregoing explanation. As the shaft 19 rotates carrying the rotor 20 with the same, the pistons are thrown outwardly a predetermined amount, depending upon the viscosity of the oil or other fluid used, and the centrifugal force. If the shaft 19 is rotating slowly, the pistons 23 are not forced outwardly to any great extent by centrifugal force and little if any oil enters the pistons 23 due to outward movement of the pistons. Accordingly, the pistons do not engage the casing tracks 13 or 14 very much and the casing 10 remains stationary, as does the shaft 12 connected therewith. If the speed of the shaft 19 is increased, however, the pistons are thrown outwardly to some extent, permitting more oil to enter the cylinder. The engagement of the pistons with the casing then tends to force these pistons inwardly due to the eccentricity of the casing tracks 13 and 14 with respect to the shaft 19, and a force is created tending to rotate the casing 13 with the shaft 19. As the shaft 19 reaches a high rate of speed, the centrifugal force increases and tends to hold the pistons 23 in outward position and tends to rotate the casing at the same speed as the shaft 19.

Figure 3:
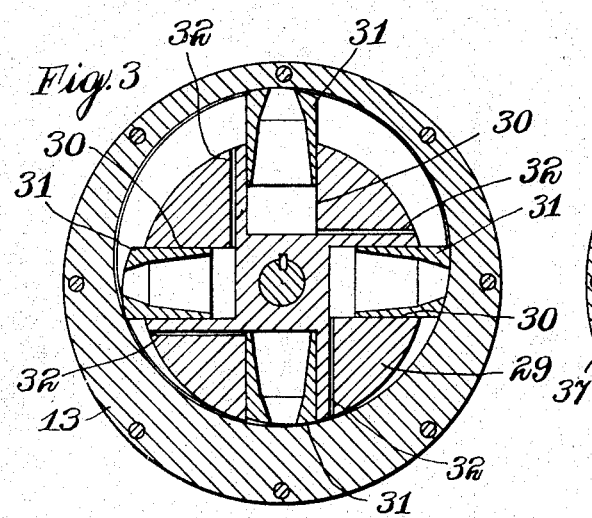
Figure 3 is a view similar to Figure 2 showing a slightly different construction.

If the casing is not entirely filled with oil or other liquid, air is apt to enter the pistons. As this air will compress under force, the action of the pistons will not be proper unless this air is expelled. In Figure 3 of the drawings, I illustrate a track portion 13 containing a rotor 29 having cylinders 30 therein to accommodate pistons 31. A small opening 32 extends from the base of each cylinder 30 to the outside of the rotor providing a passage for the escape of air from the cylinders. Thus as the pistons move inwardly, air is forced through these openings 32. The openings are of such small size that oil will not readily pass therethrough, so that the compressed oil will not be permitted to escape from the cylinder.

Figure 4:
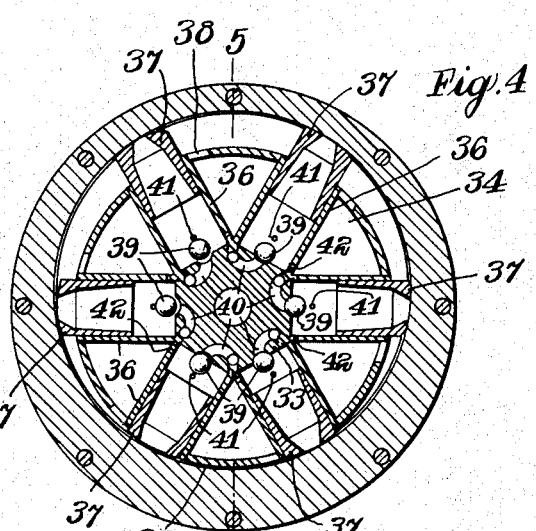
Figure 4 is a view similar to Figure 2 illustrating still a slightly different construction of parts.
Figure 5:
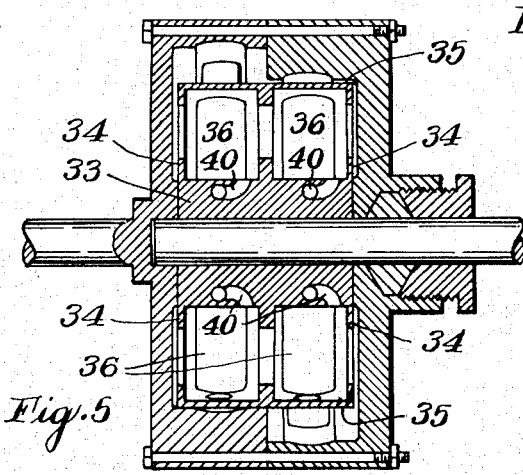
Figure 5 is an axial section similar to Figure 1 taken on the line indicated 5—5 in Figure 4.

In Figures 4 and 5 of the drawing, I disclose a construction wherein the rotors are in the form of a shell mounted upon a hub 33. The shell comprises discs 34 which connect the hub 33 with the cylindrical outer shell 35. The cylinders are in the form of tubes 36 extending radially from the hub 33 through the cylindrical shell 35. Pistons 37 are positioned in the cylinders 36. Holes 38 are formed in the shell 35.

Check valves 39 are provided at the inner end of each cylinder 36 to close a passage 40 to the exterior of the cylinders 36. The passages 40 extend through the hub 33 and permit oil to be drawn by the outward movement of the pistons 37 into the inner ends of the cylinders 36. During the compressing action, the check valves 39 are closed, cutting off the passages 40 and compressing the liquid within the cylinders. Suitable pins 41 are provided to hold the check valves 39 in position, and to limit the movement thereof away from the passages 40. Small openings 42 may be provided in the walls of the cylinders 36 to permit the escape of air trapped within the cylinders 36.

Figure 1:
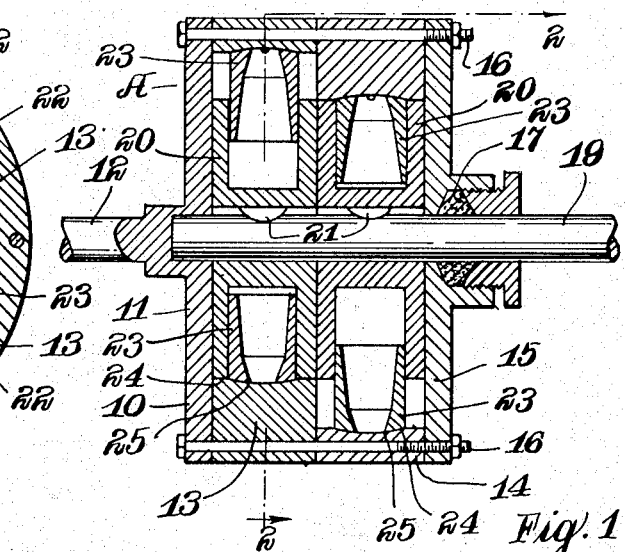
Figure 1 is a cross-sectional view taken on a vertical plane longitudinally through the axis of my transmission.

The device illustrated in Figures 4 and 5 of the drawing acts similarly to the construction illustrated in Figures 1 and 2, with the exception that oil or other liquid is permitted to enter through the hub of the rotor into the interior of the cylinders as the pistons are thrown outwardly by centrifugal force.

Figure 6:
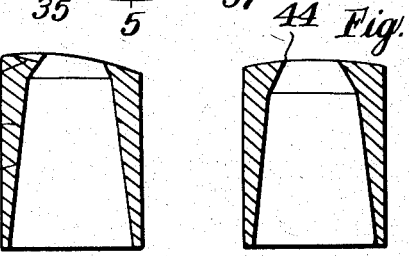
Figure 6 is a cross-sectional view centrally through a piston.
Figure 7:
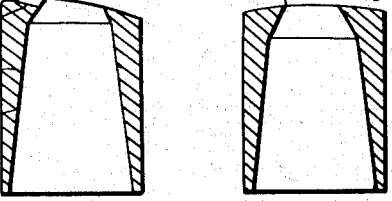
Figure 7 is a view similar to Figure 6 illustrating a slightly different form of construction of piston.

If it is desired, the pistons may be formed as in Figure 7 of the drawing, wherein the entire outer edge 44 thereof is rounded with the center of curvature on the axis of the piston. The piston illustrated in Figure 6 is believed preferable, however.

I have found that my device operates with equal success in either direction. It has been found, however, that if the type of pistons shown in Figure 6 of the drawing is used these pistons turn around by themselves in the cylinders until they are facing in the proper direction.

In accordance with the patent statutes, I have described the principles of operation and construction of my transmission or clutch, and while I have endeavored to set forth the best embodiment thereof, I desire to have it understood that this is only illustrative of a means of carrying out my invention and that obvious changes may be made within the scope of the following claims without departing from the spirit of my invention.

I claim:

1. A transmission comprising a casing secured to one shaft to rotate with the same, a rotor within said casing, a shaft upon which said rotor is mounted, radially extending cylinders closed at their inner ends in said rotor, hollow pistons radially extending in said rotor engageable with said casing, open outer ends on said pistons and an eccentric surface in said casing against which said pistons engage, said surface substantially sealing the open piston ends during movement thereof in said cylinders.

2. A transmission comprising a shaft, a rotor on said shaft rotatable therewith, a casing about said rotor having an eccentric inner wall therein, radially extending cylinders in said rotor closed at the inner ends thereof, open ended pistons slidable in said cylinders, said pistons engageable with, and substantially sealed by, said eccentric inner wall of said casing during movement of said pistons in said cylinders, and actuated thereby.

3. A transmission comprising a shaft, a rotor thereon, angularly spaced cylinders in said rotor, hollow open ended pistons in said cylinders, a casing about said rotor, and an eccentric inner wall on said casing engageable with said pistons to actuate said pistons and to substantially seal said hollow ended pistons with respect to said wall during actuation thereof.

4. A transmission comprising a shaft, a rotor thereon, angularly spaced cylinders in said rotor, hollow open ended pistons slidable in said cylinders, a housing encasing said rotor, and an inner wall on said casing against which said pistons engage and substantially seal during contact, said wall being close to said rotor on one side thereof, and spaced considerably from said rotor on the other side, said wall substantially sealing the ends of said pistons during movement thereof.

5. A transmission comprising a shaft, a rotor thereon, angularly spaced cylinders on said rotor, hollow open ended pistons in said cylinders and a track for guiding said pistons eccentric with respect to said rotor, said track engaging and substantially sealing said open ends of said pistons during engagement, said track acting to engage and to urge said pistons inwardly after they have moved outwardly.

6. A transmission comprising a shaft, a rotor on said shaft, angularly spaced cylinders on said rotor, hollow pistons in said cylinders open at both ends, and means urging said pistons into said cylinders during the rotation of said rotor, simultaneously substantially sealing the outer end of said pistons.

7. A transmission comprising a rotor, angularly spaced cylinders therein, open ended hollow pistons in said cylinders adapted to be thrown outwardly by centrifugal force, means limiting the outward movement of said pistons and guiding said pistons inwardly in the rotation of said rotor with respect to said limiting means, the engagement of said pistons with said guiding means tending to substantially close said open ends during inward piston movement and to rotate the limiting means with said rotor.

8. A transmission comprising a rotor, a series of angularly spaced cylinders therein, open ended pistons in said cylinders, a track engageable with said pistons to urge the same inwardly, said track simultaneously substantially sealing the outer ends of said pistons and an air vent extending from the bottom of said cylinders to the outside of said rotor through which air may be expelled from said cylinders.

9. A transmission comprising a rotatable member, a series of angularly spaced cylinders therein, hollow open ended pistons in said cylinders adapted to be thrown outwardly by centrifugal force, means for urging said pistons inwardly, simultaneously substantially sealing the outer ends thereof, a passage from each said cylinder to a point external of said rotatable member and a check valve in each said passage permitting fluid to flow into said cylinders.

10. A transmission comprising a rotatable member, a cylinder therein having a closed inner end, an open ended piston in said cylinder adapted to be thrown outwardly by centrifugal force, relatively rotatable means for urging said piston inwardly in the rotation of said rotatable member and simultaneously substantially sealing the outer end of said piston, creating a tendency for said urging means to rotate with said rotatable member.

WALLACE S. JONES.